US006472457B1

(12) United States Patent
Durairaj et al.

(10) Patent No.: US 6,472,457 B1
(45) Date of Patent: Oct. 29, 2002

(54) NONFORMALDEHYDE, NONFUMING RESORCINOLIC RESINS AND METHODS OF MAKING AND USING THE SAME

(75) Inventors: Raj B. Durairaj, Monroeville, PA (US); Alex Peterson, Jr., Pittsburgh, PA (US)

(73) Assignee: Indspec Chemical Corporation, Pittsburgh, PA (US)

( * ) Notice: Subject to any disclaimer, the term of this patent is extended or adjusted under 35 U.S.C. 154(b) by 18 days.

(21) Appl. No.: 09/742,586

(22) Filed: Dec. 21, 2000

(51) Int. Cl.$^7$ .............................. C08K 3/18; C08K 3/22
(52) U.S. Cl. ..................... 524/424; 524/432; 524/492; 525/134; 525/135; 525/139; 525/140; 528/219
(58) Field of Search ........................... 525/134, 135, 525/139, 140; 524/424, 493, 432; 528/219

(56) References Cited

U.S. PATENT DOCUMENTS

| | | |
|---|---|---|
| 2,746,898 A | 5/1956 | Buckwalter et al. |
| 3,596,696 A | 8/1971 | Freytag et al. |
| 4,257,926 A | 3/1981 | Tanimura et al. |
| 4,605,696 A | 8/1986 | Benko et al. |
| 4,889,891 A | 12/1989 | Durairaj et al. |
| 4,892,908 A | 1/1990 | Durairaj et al. |
| 5,021,522 A | 6/1991 | Durairaj et al. |
| 5,049,641 A | 9/1991 | Hood et al. |
| 5,244,725 A | 9/1993 | Dressler et al. |
| 5,936,056 A | 8/1999 | Durairaj et al. |

FOREIGN PATENT DOCUMENTS

| | | |
|---|---|---|
| EP | 0 798 324 A1 | 10/1997 |

*Primary Examiner*—Kriellion A. Sanders
(74) *Attorney, Agent, or Firm*—Debra Z. Anderson; Eckert Seamans Cherin & Mellott, LLC

(57) ABSTRACT

Methods for preparing formaldehyde-free resorcinol resins are disclosed. The methods generally comprise reacting resorcinol first with dicyclopentadiene and then reacting that mixture with an olefinic compound. The resins produced by this method are also disclosed, as are rubber compositions utilizing the present resins. The resins are characterized as having a free resorcinol content of about 1 wt. % or less, and yielding a suitable softening point when used in rubber applications.

24 Claims, No Drawings

NONFORMALDEHYDE, NONFUMING RESORCINOLIC RESINS AND METHODS OF MAKING AND USING THE SAME

FIELD OF THE INVENTION

The present invention relates to nonformaldehyde, nonfuming resorcinolic resins, and methods of making and using the same. These resins are particularly useful when combined with curing agents in rubber, imparting improved physical and mechanical properties such as low volatility, reduced fuming in rubber compounding, and improved adhesion properties of vulcanized rubber and rubber composites.

BACKGROUND INFORMATION

Resorcinol and resorcinol-formaldehyde resins have been used in the rubber industry as reinforcing and bonding agents in rubber compounds. These resins are unique materials for rubber compounding, since they act as thermosetting and vulcanizing plasticizers. They are very efficient plasticizers for rubber during the processing operations. Use of these resins allows easier processing, higher loading and excellent extrusions for the rubber compounds.

The thermosetting properties of resorcinol upon curing provide the vulcanizate with increased hardness, abrasion resistance, aging resistance, solvent and oil resistance, and stiffness as compared with vulcanizates made without resorcinol or its derivatives; resorcinol also gives much improved finishes to the cured rubber stock. This combination of plasticizing and reinforcing action is rare for a single material in rubber compounds.

Although resorcinol imparts good mechanical and adhesion properties to rubber, fuming of resorcinol during compounding at a temperature in excess of 110° C. can occur. To overcome the fuming problems of resorcinol, tire manufacturers are seeking modified resorcinolic derivatives and resins that do not produce volatiles at Banbury temperatures. In order to reduce fuming completely, the compounds used should not contain any free resorcinol, or should have levels of free resorcinol of about 1.0 wt. % or less.

One of the ways to reduce the fuming of resorcinol in the rubber compound is to use resorcinol-formaldehyde resins (RF resins) in place of resorcinol. Generally, RF resins are produced by the reaction of resorcinol with formaldehyde in the presence of an acid catalyst. The free resorcinol content of RF resins can be reduced by increasing the formaldehyde level. When the formaldehyde content is increased in the RF novolak synthesis, however, the softening point of the final material is also increased due to an increase in its molecular weight. If the formaldehyde level is increased beyond a certain level, the final resin will become a gel. Due to these limitations, it is very difficult to develop an RF type resin containing less than 1.0 wt. % free resorcinol with a softening point less than 105° C. For example, U.S. Pat. Nos. 2,746,898 and 3,596,696 disclose the preparation of RF resins, but the free resorcinol content in these resins is well above 1 wt. %, and, hence, the fuming problems exist with these resins. In addition, RF resins tend to absorb moisture upon exposure to humidity, and therefore soften and coalesce during storage.

Another approach developed to address the problem of resorcinol fuming is the use of derivatives of resorcinol such as alkyl, aralkyl, monoester and monoether compounds. Simple alkyl substituted resorcinol, such as methylresorcinol, is difficult to synthesize. Aralkyl substituted resorcinols often have low melting points, and are paste-like and difficult to handle by the tire industry. Synthesis of these derivatives often requires extensive processing steps that involve different organic solvents and isolation procedures. In addition, if organic solvents are used, their handling and disposal often bring more problems and cost.

U.S. Pat. No. 4,605,696 discloses the synthesis of resorcinol monobenzoate and resorcinol monorosinate and their use in the rubber compound formulation. The synthesis of monorosinate involves the use of a xylene solvent, requiring distillation and disposal of solvent waste. Resorcinol monobenzoate has a higher melting point than resorcinol and, therefore, a processing problem exists in the rubber compound application.

U.S. Pat. No. 4,892,908 discloses a keto derivative of resorcinol, namely 4-benzoylresorcinol, which can be used as a low-fuming resorcinolic derivative replacing resorcinol in rubber compounds. The preparation of benzoylresorcinol, however, requires the use of toxic chemicals, such as benzotrichloride, and highly volatile organic solvents. Therefore, the cost of benzoylresorcinol is about 3–4 times higher than that of resorcinol. In addition, benzoylresorcinol has a higher melting point than resorcinol and also exhibits processing difficulties.

Yet another approach to eliminate or minimize the resorcinol fuming is to alkylate or aralkylate part of the resorcinol and then react the product with formaldehyde to develop an alkyl or aralkyl substituted resorcinol-formaldehyde type resin. U.S. Pat. No. 4,889,891 discloses such resins formed by reacting an alkylsubstituted resorcinol, prepared from the reaction of resorcinol with dicyclopentadiene, dipentene, piperylene, or another composition, with formaldehyde. While the softening points of these resins are acceptable for rubber compounding, the resins still contain free resorcinol in amounts greater than 1 wt. %. U.S. Pat. Nos. 5,021,522 and 5,049,641 disclose resorcinolic resins prepared by reacting an aralkyl substituted resorcinol, prepared from the reaction of styrene and resorcinol, with an aqueous formaldehyde solution. Though the softening points of these resins are acceptable for the rubber compounds, the free resorcinol content is typically greater than 2.5 wt. %.

Several other attempts have been made to develop low-fuming or non-funming resorcinol modified resins for the tire industry. For example, resorcinol was used with phenol or alkylphenol and formaldehyde to develop phenol-resorcinol-formaldehyde (PRF) and alkylphenol-resorcinol-formaldehyde type resins. Problems with these compounds arise due to the handling of formaldehyde and solvents to effect the synthesis. Moreover, to achieve a modified resorcinolic resin containing less than 1.0 wt. % free resorcinol and having a softening point less than 105° C., the final distillation to remove unreacted monomers must be done at temperatures in excess of 180–190° C. and vacuum conditions of 5–6 mm of Hg. Without hot oil heating of the reactor and an efficient high vacuum pump, which require higher capital expenses, low free resorcinol levels in these resins are difficult to achieve.

U.S. Pat. No. 5,244,725 discloses the synthesis of a nonformaldehyde type resorcinolic resin from the reaction of resorcinol with bisphenol-A epoxy. Although the resin of this patent shows good dynamic mechanical properties compared to resorcinol, fuming associated with a 10.0 wt. % free resorcinol content of this resin restricts its use in the rubber compound formulations.

EP 798 324 (abstract) reports preparation of resins by reacting aromatic compounds with nonconjugated dienes in the presence of an acid catalyst. Free resorcinol content of the product, however, is still at least about two.

SUMMARY OF THE INVENTION

The present invention provides resorcinolic resins that have a wide variety of desirable properties. The resins have about 1 or less than 1 wt. % free resorcinol, and have softening points between about 75 and 1 10° C. The resins are non-fuming and are less hygroscopic as compared to other resorcinol derivatized resins, such as RF resins. The present resins are capable of undergoing cross-linking with curing agents during rubber vulcanization to give improved physical, mechanical and adhesion properties to the rubber.

Another embodiment of the present invention provides a method for making such resins, by reacting resorcinol with dicyclopentadiene, and then further reacting that product with an olefinic compound. Significantly, the methods can be carried out at processing temperatures below 180–190° C. Moreover, the process is carried out in the absence of both solvents and formaldehyde, thus eliminating handling hazards of waste solvents and distillates.

Yet another embodiment of this invention provides a rubber composition comprising: a) a rubber component; b) a methylene donor; and c) a methylene acceptor; the methylene acceptor is the novel resin of the present invention. Reinforced rubber articles further comprising d) a reinforcing material are also provided by the present invention.

It is therefore an aspect of the present invention to provide a resorcinolic resin that is non-fuming. s Another aspect of the invention is to provide a method for synthesizing a nonformaldehyde, non-fuming resorcinolic resin.

It is a further aspect of the present invention to provide a vulcanizable rubber composition having improved physical and mechanical properties.

It is another aspect of the invention to provide a vulcanized rubber composition having improved adhesion between the rubber and reinforcing material.

These and other aspects of the invention will be more fully understood from the following description of the invention and the claims appended hereto.

DETAILED DESCRIPTION OF THE INVENTION

The present invention is generally directed to a method for synthesizing a nonformaldehyde, non-fuming resorcinolic resin. The methods generally comprise the steps of mixing a catalyst with melted resorcinol; adding dicyclopentadiene to the mixture; and then adding a second quantity of catalyst to the mixture followed by an olefinic compound. The resin that results from this procedure is also within the scope of the present invention. Such resins are characterized as having low free resorcinol levels. When utilized in rubber compounding applications, the present resins impart improved physical, mechanical and adhesive properties to the rubber.

As used herein, "low free resorcinol" refers to resins that have a low level of unreacted resorcinol. Preferably, the free resorcinol content of these resins is about 1 wt. % or less unreacted resorcinol. "Non-fuming" resins are therefore resins having a low free resorcinol content; because of the low levels of free resorcinol, the resins exhibit little or no fuming during processing of rubber compounds. The term "non-fuming" is therefore intended to encompass any level of fuming that might result when using compounds having about 1 wt. % or less of free resorcinol. This feature is also referred to as "nonvolatile."

The present methods generally involve melting resorcinol, which is effected at a temperature of between 125 and 135° C. Following melting of the resorcinol, a catalyst is added, with stirring; the mixture should be stirred for a sufficient time to allow thorough mixing of the catalyst and the resorcinol, typically at least about two minutes. Dicyclopentadiene is then added to the resorcinol/catalyst mixture. Preferably, the dicyclopentadiene is added over a period of between about 30 minutes and two hours, more preferably a period of between 60 and 90 minutes; the temperature during addition of dicyclopentadiene should be maintained between about 125 and 155° C., more preferably between about 135 and 145° C. In a preferred embodiment, after addition of the dicyclopentadiene, the reaction is continued at a temperature of between about 130 to 155° C., more preferably between about 140 and 145° C.; the reaction is maintained at this temperature for enough time to effect reaction between the dicyclopentadiene and resorcinol, typically between about and 30 and 90 minutes, preferably about 60 minutes. Following this time, an additional charge of catalyst is added, preferably all at once. An olefinic compound is then added slowly to the mixture. As with the dicyclopentadiene, the olefinic compound is preferably added over a period of between about 30 minutes to two hours, more preferably between about 60 and 90 minutes. The temperature during addition of the olefm is preferably maintained between approximately 130 and 155° C., more preferably between about 140 and 145° C. Following addition of the olefinic compound, the reaction can be maintained for between about 30 and 90 minutes, preferably about 60 minutes. The mixture should then be heated to between about 150 and 165° C., preferably about 155 to 160° C. Stirring is maintained at this elevated temperature for at least about 30 minutes, preferably 60 minutes or longer, after which the reaction temperature can be lowered and a basic compound added to neutralize the catalyst. To remove any unreacted dicyclopentadiene or olefmic compound, vacuum distillation is preferably used, although other means known to those skilled in the art could also be employed. Such distillation can be applied prior to the second addition of catalyst, at the end of the procedure, or both.

Any acid catalyst can be used in each of the catalyst addition steps according to the present invention. Suitable acid catalysts include, but are not limited to, $H_2SO_4$, $H_3PO_4$, aromatic and aliphatic sulfonic acids, and the like. The preferred catalyst is p-toluenesulfonic acid (PTSA).

Both aromatic and aliphatic olefinic compounds can be used according to the present invention. The olefin reacts with both the resorcinol/dicyclopentadiene end product and the free resorcinol. The aromatic olefinic compounds as used in the present invention include any aromatic olefinic compounds of the general formula (1).

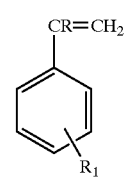

(1)

wherein R is selected from the group consisting of H, $CH_3$ and halogen, and $R_1$ is independently selected from the group consisting of H, OH, an alkyl group having from 1 to 6 carbons, a halogen and —CH=$CH_2$. Preferably, the aromatic olefinic compound is an aromatic vinyl compound including alpha-methylstyrene, p-methylstyrene, alpha-chlorostyrene and divinylbenzene. Most preferred is styrene. Vinylnaphthalene can also be used; it will be appreciated that vinylnaphthalene is not represented by formula 1.

Aliphatic olefinic compounds can also be used, including but not limited to butene, diisobutylene, piperylene, dipentene, isoprene, butadiene, and pinene. A preferred aliphatic olefinic compound is dipentene.

The molar ratio of resorcinol to dicyclopentadiene to olefinic compound is generally as follows. For each mole of resorcinol, at least about 0.25 moles of dicyclopentadiene are used and at least about 0.9 moles of olefinic compound are used. Preferably, the molar ratio of dicyclopentadiene and olefinic compound combined, for each mole of resorcinol, is at least about 1.4. A particularly preferred method utilizes approximately 0.4 moles of dicyclopentadiene and one mole of styrene for every mole of resorcinol.

A catalytically effective amount of catalyst should be used in each of the catalyst addition steps of the present methods, the amount of which can be determined by one skilled in the art. In a preferred embodiment, about 1 gram of PTSA catalyst is used per one mole of resorcinol in the initial charge, with approximately 0.5 grams of catalyst being added at the second charge. The catalyst used in each of the catalyst addition steps is preferably the same, but does not have to be.

One advantage of the method of the present invention is the production of a non-volatile or non-fuming resin having a low free resorcinol content. Other advantages of the procedure are that it generates a low amount of waste since yields are nearly 100%, has minimal toxicity levels, and uses relatively low temperatures and low pressures.

As noted above, the present invention is also directed to the resorcinolic resins produced from the present method. These resorcinolic resins are characterized as being non-volatile or non-fuming, that is, having a low free resorcinol content. Accordingly, these resins can be used in any application in which a non-fuming, low free resorcinol resin is desired.

The resins of the present invention are particularly useful in rubber compounding applications. As discussed above, resorcinol and resorcinol-formaldehyde resins have historically been used in the tire and rubber industry as adhesion promoters for synthetic fabric and steel cord to rubber bonding. Although resorcinol enhances both the mechanical and bonding properties of the cured rubber compounds, the volatility of this material under rubber processing temperatures has prompted some tire manufacturers to use precondensed resorcinol-formaldehyde novolak type resins instead of a resorcinol monomer. The main advantage for using these resins in rubber compound formulations is the reduction of free resorcinol content. The resins of the present invention serve to reduce the free resorcinol content even further. In addition, the resins of the present invention can be produced at a low cost and provide comparable performance for rubber applications than those resins currently commercially available. In addition to their low free resorcinol content, the resins of the present invention, when used in rubber compounding applications, yield a low softening point that enhances the processing of the rubber, provide enhanced adhesion characteristics with reinforcements such as steel, polyester, nylon and others, and provide enhanced mechanical properties such as modulus and elongation.

The present invention is therefore further directed to a vulcanizable rubber composition having improvements in physical and mechanical properties such as dynamic stiffness, hardness, scorch safety and cure time. The vulcanizable rubber composition of the present invention comprises: (a) a rubber component selected from natural rubber, synthetic rubber or combinations thereof; (b) a methylene donor; and (c) a methylene acceptor. The methylene acceptor comprises the low free resorcinol resins of the present invention, such as those prepared by the methods described above.

"Rubber" as used herein refers to both natural and synthetic rubber. Representative synthetic rubber polymers include the butadiene polymers. Butadiene polymers include those polymers having rubber-like properties, polymerizing butadiene alone or with one or more other polymerizable ethylenically unsaturated compounds, such as styrene, methylstyrene, methyl isopropenyl ketone and acrylonitrile; the butadiene is preferably present in the mixture as at least 40% of the total polymerizable material. Other synthetic rubbers include the neoprene rubbers. Isobutylene rubber (butyl) and ethylene-propylene rubber (EPDM) may also be employed.

Any suitable methylene donor can be used. Preferred are hexamethylenetetraamine (HMTA), di-, tri-, tetra-, penta-, or hexa-N-methylol-melamine or their partially or completely etherified or esterified derivatives, for example hexamethoxymethylmelamine (HMMM), oxazolidine or N-methyl-1,3,5-dioxazine.

Typically, the methylene acceptor is incorporated into the rubber component in an amount ranging from about 1 to 25 parts by weight based on 100 parts by weight of the rubber component (1 to 25 phr). Preferably, the methylene acceptor is incorporated into the rubber component in an amount from about 1 to 5 phr.

Generally, the weight ratio of methylene acceptor to methylene donor is from about 1:10 to 10:1, more preferably 1:3 to 3:1. If HMTA is the methylene donor, the weight ratio is preferably at least about 2:1.

In a preferred embodiment, a vulcanizable rubber composition is provided as described above wherein the methylene acceptor is the addition product of resorcinol and dicyclopentadiene, further reacted with styrene. The preferred embodiment also includes using PTSA as a catalyst both when the addition product of resorcinol and dicyclopentadiene is formed and when further reacting this addition product with styrene.

It will be understood by those skilled in the art that the vulcanizable rubber composition of this invention may also include one or more additives comprising sulfur, carbon black, zinc oxide, silica, an antioxidant, a stearate, an accelerator, an oil or an adhesion promoter.

In another embodiment of this invention, a vulcanizable rubber composition is provided as described above, further comprising (d) a reinforcing material. Any reinforcing material known in the art can be used, including, but not limited to, nylon, rayon, polyester, aramid, glass, steel (brass, zinc or bronze plated) or other organic or inorganic compositions. These reinforcing materials may be in the form of filaments, fibers, cords, or fabrics.

Following the formation of the rubber component, vulcanization can be carried out by methods known in the art.

It will be appreciated that the resin formed by the reaction of the methylene acceptor and methylene donor as described above promotes adhesion between the rubber and the reinforcing materials while simultaneously providing an improvement in the rubber vulcanizate properties such as hardness and dynamic stiffness, as well as improving scorch safety time and providing longer cure times when compared to other compounds. The rubber composition of the present invention further has improved adhesion properties for adhering rubber to the reinforcing materials as described above. Optionally, the reinforcing material can be pretreated or coated with adhesives.

EXAMPLES

The following examples are intended to illustrate the invention and should not be construed as limiting the invention in any way.

EXAMPLE NO. 1

Into a four-necked flask equipped with a mechanical stirrer, thermometer, reflux condenser and an addition funnel, 1.0 mole (110.1 grams) of resorcinol was charged and heated to 125–135° C. When the resorcinol was completely melted, 1.0 gram of PTSA catalyst was added and stirred for 5.0 minutes. After this, 0.25 mole (33.1 grams) of dicyclopentadiene was added from the addition funnel over a period of 60 minutes at 135–145° C. The reaction was continued at this temperature for an additional 60-minute period before heating to 155–160° C. To complete the reaction between resorcinol and dicyclopentadiene, the reaction mixture was stirred for 60 minutes more at 155–160° C. Finally, vacuum was applied to remove any unreacted dicyclopentadiene under 28" of Hg and 155–160° C. temperature conditions. Vacuum distillation did not produce any distillable material, indicating the completion of the resorcinol-dicyclopentadiene reaction. The final material showed a softening point of 64.6° C. and a free resorcinol content of 41.0 wt. % by LC/GC analysis. The details are given in Table 1, below.

EXAMPLE NO. 2

In the same manner as described in Example No. 1, another resin was made using 1.0 mole (110.1 grams) of resorcinol and 0.5 mole (66.2 grams) of dicyclopentadiene. The final resin material showed a softening point of 105.2° C. and a free resorcinol content of 20.0 wt. % by the LC/GC analysis.

Though the softening point of this resin is acceptable for rubber compounding applications, the free resorcinol content of 20% is well beyond the level that would characterize this resin as nonfuming. From the experimental results of Examples 1 and 2, there was evidence that the use of dicyclopentadiene alone in the resorcinolic resin synthesis appeared to yield high levels of free resorcinol and to increase the softening point of the reaction product. The details are also given in Table 1, below.

EXAMPLE NO. 3

In the same manner as described in Example No. 1, a resin was made using 1.0 mole (110.1 grams) of resorcinol and 1.5 moles (156.2 grams) of styrene instead of dicyclopentadiene. The final resin appeared as a paste with a softening point less than 60° C. and free resorcinol content of 1.4 wt. % (Table 1). Due to the low melting point, handling difficulties would occur both in the commercial production of this material as well as in its use by the tire industry.

EXAMPLE NO. 4

Into a four-necked reaction kettle equipped with a mechanical stirrer, thermometer, reflux condenser and an addition funnel, 1.0 mole (110.1 grams) of resorcinol was charged and heated to 125–135° C. When the resorcinol melted completely, 1.0 gram of PTSA catalyst was added and stirred for 5.0 minutes. After this, 0.5 mole (66.2 grams) of dicyclopentadiene was added from the addition funnel over a period of 60–90 minutes at 135–145° C. Following the dicyclopentadiene addition, the reaction was continued at 140–145° C. for an additional 60 minutes. Then, a second charge of 0.5 gram of PTSA catalyst was added and 0.3 mole (31.2 grams) of styrene was added slowly from the addition funnel at 140–145° C. over a period of 60–90 minutes. Following the addition of styrene, the reaction was continued at this temperature for 60 minutes more before heating to 155–160° C. To complete the reaction, stirring was continued at 155–160° C. for an additional 60 minutes. Next the reaction temperature was lowered slightly and 0.8 grams of 50% NaOH was added to neutralize the PTSA catalyst. Finally, vacuum was applied to remove any unreacted dicyclopentadiene and styrene monomers. The conditions for distillation were 28" of Hg and 155–160° C. Vacuum distillation did not produce any appreciable distillate indicating the completion of the reaction of resorcinol with dicyclopentadiene and styrene. The final resin showed a softening point of 127.2° C. and free resorcinol content of 6.9 wt. % by LC/GC analysis. The details are shown in Table 1, below.

The final material properties are not generally acceptable for rubber compounding applications due to both the high softening point and free resorcinol in excess of about 1 wt. %.

EXAMPLE NOS. 5–12

In the same manner as described in Example No. 4, a series of resorcinolic resins were synthesized using 1.0 mole of resorcinol with 0.25–0.5 mole of dicyclopentadiene and 0.5–1.3 mole of styrene. As can be seen from the experimental results (Table 1), low free resorcinol containing resins with softening points in the range of 70–95° C. were synthesized in Example Nos. 8, 10, 11 and 12. The most desirable product was that of Example 8.

TABLE 1

|  | Example | | | | | | | | | | | |
| --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 |
| CHARGE (Moles) | | | | | | | | | | | | |
| Resorcinol | 1 | 1 | 1 | 1 | 1 | 1 | 1 | 1 | 1 | 1 | 1 | 1 |
| Dicyclopentadiene | 0.25 | 0.5 | None | 0.5 | 0.5 | 0.5 | 0.4 | 0.4 | 0.35 | 0.3 | 0.25 | 0.25 |
| Styrene | None | None | 1.5 | 0.3 | 0.5 | 0.7 | 0.8 | 1 | 1.1 | 1.2 | 1.25 | 1.3 |
| Physical Properties | | | | | | | | | | | | |

TABLE 1-continued

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Free Resorcinol (Wt. %, By LC) | 41 | 20 | 1.4 | 6.9 | 3.8 | 1.8 | 2.3 | 0.95 | 1.2 | 0.75 | 1 | 0.93 |
| Softening Point (° C.) | 64.6 | 105.2 | <60 | 127.2 | 115.9 | 113.6 | 88.9 | 95.2 | 84.9 | 78.2 | 71.3 | 70.1 |

EXAMPLE NOS. 13–15

In the manner as described in Example 4, additional resorcinol-dicyclopentadiene-styrene reactions were prepared. In these experiments, styrene was allowed to react with resorcinol in the first stage of the reaction followed by the dicyclopentadiene reaction in the second stage. The details of experimental results are summarized in Table 2. As can be seen, reversing the addition of reactants in the resorcinol-dicyclopentadiene-styrene reaction not only produced resins with unacceptable lower softening point but also higher free resorcinol contents.

This demonstrates that the order of addition as taught herein plays a role in synthesizing the nonformaldehyde resins of this invention.

TABLE 2

| EXAMPLE: | 13 | 14 | 15 |
|---|---|---|---|
| CHARGE (Moles) | | | |
| Resorcinol | 1 | 1 | 1 |
| Styrene | 1 | 1.2 | 1.2 |
| Dicyclopentadiene | 0.4 | 0.2 | 0.3 |
| Physical Properties | | | |
| Free Resorcinol (Wt. %, By LC) | 2.1 | 2.4 | 1.6 |
| Softening Point (° C.) | 75.6 | 58.5 | 64.4 |

EXAMPLE NO. 16

The black natural rubber compounds were prepared in three stages to test the processing and reinforcing effect of resorcinol-dicyclopentadiene-styrene resins against resorcinol. The basic compound formulation is shown in Table 3.

In the first state, the black masterbatch was mixed in a lab-size internal mixer to a dump temperature of 150° C. and sheeted to a thickness of 8 mm. In the second stage, an appropriate amount of the black masterbatch for each compound was mixed with the required level of resorcinol or resorcinolic resin on a two-roll lab mill at 120–125° C. The compounds were sheeted and cooled. The sulfur, accelerator and an appropriate amount of HMTA were added to the compound in the third stage, using the two-roll mill at 90–95° C. The compounds were aged overnight in a constant temperature room at 23° C. and 50% relative humidity before testing.

Table 4 illustrates the cure behavior, physical and mechanical properties obtained on the cured samples for resorcinol and the resorcinol-dicyclopentadiene-styrene resins of Example Nos. 8, 10 and 11.

It is clear from the Table 4 results that the methylene acceptors of this invention are nonfuming resins in contrast to resorcinol alone. MDR rheometer cure at 150° C. data showed that the present resorcinol-dicyclopentadiene-styrene resins improved the scorch time (TS) of the rubber compounds but with slightly increased cure times T90. From the dynamic mechanical test results set forth in Table 4, improved mechanical properties, such as the hardness, dynamic storage modulus (G') and low hysteresis (tan delta) were observed for compounds made from the resins of Example Nos. 8, 10 and 11 over a compound using resorcinol.

TABLE 3

| Rubber Compound Used in Testing Masterbatch | Parts by weight |
|---|---|
| 1. Natural Rubber | 100 |
| 2. Carbon Black (N-326) | 55 |
| 3. Zinc Oxide | 8 |
| 4. Stearic Acid | 1 |
| 5. N-(1,3-Dimethylbutyl)-N'-phenyl-p-phenylenediamine | 2 |
| 6. Pre-Vulcanization Inhibitor (N-(cyclohexylthio)phthalimide) | 0.2 |
| 7. Polymerized 1,2-Dihydro-2,2,4-trimethyl quinoline | 1 |
| 8. Sulfur | 2 |
| 9. TBBS (N-t-Butyl-benzothiazole sulfenamide) | 1 |
| 10. HMTA (Hexamethylene tetraamine) | 0.5 |
| 11. Methylene Acceptor (Resorcinolic Compound) | 3 |

TABLE 4

| Methylene Acceptor: | Resorcinol | R/DCPD/STY (Example 8) | R/DCPD/STY (Example 10) | R/DCPD/STY (Example 11) |
|---|---|---|---|---|
| Fuming @ 120° C. | Very High | None | None | None |
| Dynamic Properties-0.2% Strain | | | | |
| G', MPa | 18.92 | 23.83 | 23.34 | 21.93 |
| Tan Delta | 0.089 | 0.079 | 0.085 | 0.086 |
| Dynamic Properties-2.0% Strain | | | | |
| G', MPa | 9.96 | 13.25 | 12.75 | 12.03 |
| Tan Delta | 0.239 | 0.228 | 0.244 | 0.245 |
| Hardness, Shore A | 77 | 80 | 79 | 78 |
| Tensile Properties | | | | |
| 100% Modulus, MPa | 4.23 | 4.43 | 4.24 | 4.18 |
| 300% Modulus, MPa | 17.15 | 17.23 | 16.35 | 16.34 |
| Strength, MPa | 26.57 | 26.83 | 26.65 | 25.89 |
| Elongation (%) | 451 | 459 | 471 | 455 |
| Energy to Break, N-m | 23.94 | 24.36 | 25.37 | 23.38 |
| Tear Strength (Die-C), KN/M | 118.3 | 129.1 | 117 | 122.8 |

R = Resorcinol
DCPD = Dicyclopentadiene
Sty = Styrene

EXAMPLE NO. 17

Dipentene is a cycloaliphatic compound containing two unsaturated groups similar to dicyclopentadiene. In order to investigate the reaction between resorcinol and dipentene, the following experiment was conducted.

In the same manner as described in Example No. 1, a resorcinol-dipentene reaction product was made using 1.0 mole (110.1 grams) of resorcinol and 1.0 mole (136.2 grams) of dipentene in the presence of PTSA catalyst. The final resin material appeared as a paste and contained 6.8 wt. % free resorcinol; these characteristics are unacceptable for commercial production and use by the tire industry due to difficult handling problems.

EXAMPLE 18

A 500-ml reaction kettle equipped with a stainless steel stirrer, thermometer, reflux condenser and an addition funnel was charged with 1.0 mole (110.1 grams) of resorcinol. The kettle was heated to 125–135° C. to completely melt the resorcinol. Then 1.0 gram of PTSA was added into the molten resorcinol and stirred for 2.0 minutes to thoroughly mix. After this, 0.5 mole (66.1 grams) of dicyclopentadiene was added slowly from the addition funnel for a period of 60–90 minutes at 135–145° C. temperature. The contents of the reaction flask were stirred for an additional period of 60–90 minutes at 145–155° C. to complete the reaction. Then, the reaction temperature was lowered slightly and a second PTSA charge (0.5 gram) was added into the reaction mixture. After this, 0.6 mole (81.7 grams) of dipentene was added slowly in such a way that the reaction temperature was maintained at 145–150° C. The addition time of dipentene was varied between 60–90 minutes. Contents of the reaction kettle were stirred continuously for an additional 30 minutes before raising the temperature to 155–160° C. After continuing the stirring at 155–160° C. for an additional 90 minutes, the reaction temperature was lowered and then 0.8 grams of 50% NaOH was added to neutralize the acid catalyst. A distillation condenser set-up was attached and an atmospheric distillation was continued until the temperature reached 155–160° C. Vacuum was then slowly applied until final distillation conditions of 28" of Hg and 155–160° C. were reached. The resin material was finally discharged from the resin kettle. The resin made from this procedure showed a softening point of 116.9° C. and 4.5 wt. % free resorcinol.

The details are given in Table 5, below.

EXAMPLE NOS. 19–25

In the same manner as described in Example No. 18, a series of resorcinolic resins was synthesized using 1.0 mole of resorcinol with 0.3–0.4 mole dicyclopentadiene and 0.7–1.15 mole dipentene. As can be seen from Table 5, nonformaldehyde-type resins with low free-resorcinol content can be synthesized from resorcinol for the rubber reinforcement and other applications.

TABLE 5

| | EXAMPLE | | | | | | | | |
|---|---|---|---|---|---|---|---|---|---|
| | 17 | 18 | 19 | 20 | 21 | 22 | 23 | 24 | 25 |
| CHARGE (Moles) | | | | | | | | | |
| Resorcinol | 1 | 1 | 1 | 1 | 1 | 1 | 1 | 1 | 1 |
| Dicyclopentadiene | None | 0.5 | 0.4 | 0.4 | 0.3 | 0.3 | 0.3 | 0.25 | 0.3 |
| Styrene | 1 | 0.6 | 0.7 | 0.8 | 0.8 | 1 | 1.1 | 1.1 | 1.15 |
| Physical Properties | | | | | | | | | |
| Free Resorcinol (Wt. %, By LC) | 6.8 | 4.5 | 3.5 | 2.3 | 3.8 | 1.7 | 1.1 | 1.6 | 0.8 |
| Softening Point (° C.) | <60 | 116.9 | 118.5 | 115.5 | 102.1 | 100 | 100.9 | 94.6 | 102.9 |
| Appearance | Paste | Brittle | Brittle | Brittle | Brittle | Brittle | Brittle | Brittle | Brittle |

EXAMPLE 26

Fuming of resorcinol and resorcinolic resins at internal-mixer temperatures above 110C is associated with the volatility of unreacted resorcinol. One way to determine the volatility of a material is to run the thermogravimetric analysis. Table 6 shows the thermogravimetric analysis results of resorcinol and resorcinol-dicyclopentadiene-styrene resins carried out in a nitrogen atmosphere at 10° C./minute heating rate.

TABLE 6

Thermogravimetric Analysis Results of Resorcinol and Resorcinolic Resins

| | | % Weight Loss at* | | | | |
|---|---|---|---|---|---|---|
| | Compound | 125° C. | 150° C. | 175° C. | 200° C. | 225° C. |
| 1. | Resorcinol | 1.7 | 8.5 | 32.6 | 96.4 | 99.1 |
| 2. | R-DCPD-STY Resin (Example 8) | 0.4 | 0.6 | 1 | 1.7 | 3.3 |
| 3. | R-DCPD-STY Resin (Example 10) | 0.3 | 0.5 | 1.2 | 2.5 | 4.5 |

*Heating Rate: 10° C./Minute in Nitrogen Atmosphere
R = Resorcinol, DCPD = Dicyclopentadiene, STY = Styrene From the results of Table 6, it is clear that the resins of this invention produced very low volatiles at elevated temperatures as compared to resorcinol.

Whereas particular embodiments of this invention have been described above for purposes of illustration, it will be evident to those skilled in the art that numerous variations of the details of the present invention may be made without departing from the invention as defined in the appended claims.

What is claimed is:

1. A method for synthesizing a nonformaldehyde resorcinolic resin comprising:
    a) mixing an acid catalyst with melted resorcinol;
    b) adding dicyclopentadiene to the mixture of step a);
    c) adding an acid catalyst to the mixture of step b); and
    d) adding an olefinic compound to the mixture of step c); wherein for every mole of resorcinol used, at least about 0.25 moles of dicyclopentadiene is used and at least about 0.9 moles of olefinic compound is used.
2. The method of claim 1, wherein at least about 0.2–2.0 grams of catalyst per mole of resorcinol is added in each of steps a) and c).

3. The method of claim 1, wherein said dicyclopentadiene is added over a period of between about 30 minutes and two hours.

4. The method of claim 3, wherein the mixture of step b) is stirred for a time sufficient to complete the reaction between resorcinol and dicyclopentadiene before step c) is performed.

5. The method of claim 1, wherein said olefinic compound is added over a period of between 30 minutes and two hours.

6. The method of claim 1 further comprising:
   e) stirring the mixture of step d) for a time sufficient to complete the reaction between the olefin and the free resorcinol.

7. The method of claim 6, wherein said time is at least about 60 minutes.

8. The method of claim 6, further comprising:
   f) employing vacuum distillation to either or both the product of step b) and the product of step e) to remove any unreacted dicyclopentadiene and/or olefin compound.

9. The method of claim 1, wherein said acid catalyst of step a) and said catalyst of step c) are the same or different and are selected from the group consisting of $H_2SO_4$, $H_3PO_4$, aromatic sulfonic acids, and aliphatic sulfonic acids.

10. The method of claim 9, wherein said catalyst is p-toluenesulfonic acid.

11. The method of claim 1, wherein said olefinic compound is an aromatic olefin having the general formula 1:

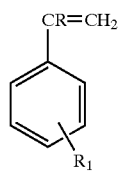

(1)

wherein R is selected from the group consisting of H, $CH_3$ and halogen, and $R_1$ is independently selected from the group consisting of H, OH, an alkyl group having from 1 to 6 carbons, a halogen and $-CH=CH_2$.

12. The method of claim 11, wherein said aromatic olefin is styrene.

13. The method of claim 1, wherein said olefinic compound is vinylnaphthalene.

14. The method of claim 1, wherein said olefinic compound is an aliphatic olefin selected from the group consisting of butene, diisobutylene, piperylene, dipentene, isoprene, butadiene, and pinene.

15. The method of claim 14, wherein said aliphatic olefin is dipentene.

16. The resorcinolic resin prepared according to the method of claim 1.

17. A vulcanizable rubber composition comprising:
   a) a rubber component selected from natural rubber, synthetic rubber, or combinations thereof;
   b) a methylene donor; and
   c) a methylene acceptor prepared according to the method of claim 1.

18. The composition of claim 17, wherein said methylene acceptor is incorporated into said rubber component in an amount from about 1 to 25 parts by weight based on 100 parts by weight of said rubber component.

19. The composition of claim 18, wherein said methylene acceptor is incorporated into said rubber component in an amount from about 1 to 5 parts by weight based on 100 parts by weight of said rubber component.

20. The composition of claim 17, wherein the weight ratio of methylene acceptor to methylene donor is between about 1:10 to 10:1.

21. The composition of claim 17, wherein said methylene donor is selected from the group consisting of hexamethylenetetraamine, di-, tri-, tetra-, penta-, or hexa-N-methylolmelamine, hexamethoxymethylmelamine, oxazolidine and N-methyl-1,3,5-dioxazene.

22. The compound of claim 21, wherein said methylene donor is hexamethylenetetraamine and the weight ratio of methylene acceptor to methylene donor is at least 2:1.

23. The composition of claim 17, further including (d) a reinforcing material.

24. The composition of claim 17, further comprising one or more additives selected from the group consisting of sulfur, carbon black, zinc oxide, silica, an antioxidant, a stearate, an accelerator, an oil and an adhesion promoter.

* * * * *

UNITED STATES PATENT AND TRADEMARK OFFICE
CERTIFICATE OF CORRECTION

PATENT NO. : 6,472,457 B1
DATED : October 29, 2002
INVENTOR(S) : Raj B. Durairaj et al.

It is certified that error appears in the above-identified patent and that said Letters Patent is hereby corrected as shown below:

Column 2,
Line 44, "non-funming" should read -- non-fuming --.

Column 3,
Line 8, "1 10°" should read -- 110° --.
Line 29, "non-fuming.s" should read -- non-fuming. --.
Line 29, "Another" should start a new paragraph.

Column 4,
Line 25, "olefm" should read -- olefin --.
Line 36, "olefmic" should read -- olefinic --.

Column 11-12,
Table 5, 1st column, "Styrene" should read -- Dipentene --.

Column 12,
Line 23, "110C" should read -- 110°C --.

Column 14,
Line 5, "olefm" should read -- olefin --.

Signed and Sealed this

Twenty-seventh Day of May, 2003

JAMES E. ROGAN
*Director of the United States Patent and Trademark Office*